United States Patent [19]

Lee

[11] Patent Number: 5,149,739
[45] Date of Patent: Sep. 22, 1992

[54] FIBER-REINFORCED THERMOPLASTIC ELASTOMER POLYURETHANE COMPOSITIONS WITH EITHER MODIFIED AND/OR UNMODIFIED POLYOLEFINS

[75] Inventor: Biing-lin Lee, Broadview Heights, Ohio

[73] Assignee: The BFGoodrich Company, Brecksville, Ohio

[21] Appl. No.: 778,553

[22] Filed: Aug. 26, 1991

Related U.S. Application Data

[63] Continuation of Ser. No. 508,880, Apr. 12, 1990, abandoned, which is a continuation-in-part of Ser. No. 226,589, Aug. 1, 1988, Pat. No. 4,975,207.

[51] Int. Cl.[5] ............... C08L 51/06; C08L 75/04; C08K 3/36; C08K 7/14
[52] U.S. Cl. ................ 525/66; 525/125; 525/127; 524/504; 524/507
[58] Field of Search ............ 525/66, 125, 127; 524/504, 507

[56] References Cited

U.S. PATENT DOCUMENTS

| | | |
|---|---|---|
| 3,272,890 | 9/1966 | O'Leary, Jr. . |
| 4,342,847 | 8/1982 | Goyert et al. . |
| 4,423,185 | 12/1983 | Matsumoto et al. . |
| 4,500,671 | 2/1985 | Goyert et al. . |
| 4,883,837 | 11/1989 | Zabrocki ..................... 525/66 |
| 4,913,971 | 4/1989 | Beck et al. .................. 525/125 |

OTHER PUBLICATIONS

The Handbook of Thermoplastic Elastomers, edited by Benjamin M. Walker, Chapter 5, Thermoplastic Polyurethane Elastomers, p. 244, Van Nostrand Reinhold Co., 1979.

Primary Examiner—James J. Seidleck
Assistant Examiner—Thomas Hamilton, III
Attorney, Agent, or Firm—Daniel J. Hudak; Nestor W. Shust

[57] ABSTRACT

A thermoplastic elastomer polyurethane is made having improved properties such as flexural modulus, flexural strength, and improved melt processability. An unaged polyurethane containing free isocyanate groups is made in situ in a high shear blending apparatus. The unaged polyurethane is typically transferred to another high shear blending apparatus and blended with either an unmodified polyolefin and/or a carbonyl modified polyolefin along with optional but desirable fibers to produce a thermoplastic elastomer polyurethane composition.

15 Claims, 1 Drawing Sheet

FIBER-REINFORCED THERMOPLASTIC ELASTOMER POLYURETHANE COMPOSITIONS WITH EITHER MODIFIED AND/OR UNMODIFIED POLYOLEFINS

CROSS-REFERENCE

This application is a continuation of application Ser. No. 07/508,880, filed on Apr. 12, 1990, now abandoned, of Biing-lin Lee, for "Fiber-reinforced Thermoplastic Elastomer Polyurethane Compositions with Either Modified and/or Unmodified Polyolefins," which in turn is a continuation-in-part of Ser. No. 226,589, filed Aug. 1, 1988, for "Fiber-reinforced Thermoplastic Elastomer Polyurethane Compositions with Either Modified and/or Unmodified Polyolefins," now U.S. Pat. No. 4,975,207.

FIELD OF THE INVENTION

Thermoplastic elastomer polyurethane compositions are made by forming in situ an unaged polyurethane containing free isocyanate groups and subsequently mixing the same under high shear conditions with either a modified and/or an unmodified polyolefin in the presence of fibers.

BACKGROUND ART

Thermoplastic polyurethane polymers are non-crosslinked polymers having hard segments therein such as free isocyanate. Thermoplastic polyurethane have been blended with a variety of polymers. For example, the Handbook of Thermoplastic Elastomers, edited by Benjamin M. Walker, Chapter 5, Thermoplastic Polyurethane Elastomers, page 244, Van Nostrand Reinhold Co., 1979, states that color concentrates in low-density polyethylene can be added to polyurethane. However, the amount of the low density polyethylene is utilized in levels of less than three percent since they effect polymer properties and processing.

U.S. Pat. No. 3,272,890 to O'leary relates to a blend composition containing a very high amount of a polyolefin, for example in excess of 75 percent by weight, and a very low amount of a low hardness polyurethane, for example less than 25 percent by weight.

U.S. Pat. No. 4,342,847 (Goyert et al, Aug. 3, 1982) relates to an improved process for the production of thermoplastic polymer mixtures by the reaction of starting components for the preparation of polyurethane in the presence of a previously prepared thermoplastic in an extruder, preferably a self-cleaning double screw extruder.

U.S. Pat. No. 4,423,185 (Matsumoto et al, Dec. 27, 1983) relates to a soft and flexible thermoplastic resinous composition having high impact and tear resistances, a good processability and a good thermal adhesion to a wide variety of plastic and other materials. The resinous composition consists essentially of 5 to 70 weight percent of a thermoplastic polyurethane elastomer and 30 to 95 weight percent of a modified polyolefin or an olefin copolymer having functional groups of at least one type selected from carboxyl, carboxylate salt, carboxylic anhydride, amide, hydroxyl and epoxy groups.

Heretofore, carbonyl modified polyolefins have been made and have generally been utilized as coupling agents for glass fiber reinforced polypropylene, as a melt adhesive, and as a tie layer for coextrusion of polyolefin with aluminum foil.

SUMMARY OF THE INVENTION

A polyurethane thermoplastic elastomer composition containing modified and/or unmodified polyolefin is typically prepared by utilizing at least two high shear processing apparatuses such as a twin screw extruder. The first apparatus produces a thermoplastic elastomer polyurethane containing free isocyanate, hereinafter referred to as an unaged polyurethane. In the second blending or mixing apparatus, the unaged polyurethane is mixed with the modified and/or unmodified polyolefin and optional fibers. The thermoplastic elastomer polyurethane compositions have improved properties such as increased modulus, improved flexural strength and lower melt viscosity. The amount of the modified and/or unmodified polyolefin is generally up to about 40 parts by weight for every 100 parts by weight of the unaged polyurethane. The polyurethane compositions of the present invention produce products which have a smooth, glossy finish.

DETAILED DESCRIPTION OF THE INVENTION

In an original or generally a one-stage mixing embodiment as set forth in U.S. Ser. No. 07/226,589 now U.S. Pat. No. 4,975,207, the invention relates to a blend of a thermoplastic elastomer polyurethane and an impact modifier. The blend can be used to produce heat molded products for automotive applications including for example automotive body side moldings, fender extensions, and rocker panels. A reinforcing agent can be added to the blend to yield a polyurethane composite for similar applications. By the term "one-stage," it is meant that the various components are added to a single high shear blending device.

A present or at least a two-stage embodiment of this invention relates to a composition and method for the preparation of a polyurethane blend having improved flexural modulus and strength. As in the earlier embodiment, the blend has utility in producing heat-molded products for automotive applications including, for example, automotive body side moldings, fender extensions, and rocker panels. Also, a reinforcing agent can be added to the blend to yield a polyurethane composite for similar applications. By the term at least a "two-stage," it is meant that at least two high shear blenders are utilized. An ester intermediate, a chain extender such as a diol, and excess polyisocyanate are reacted in the first extruder and the product obtained is transferred to at least a second extruder and reacted with polyolefin, fibers and filler.

The polyurethane blends or composites in the original embodiment generally comprise a thermoplastic elastomer polyurethane and an impact modifier, while the present or generally two-stage embodiment comprises an unaged polyurethane polymer containing free isocyanate. Both embodiments optionally contain reinforcing agents such as fibers, talc, etc., and optionally fillers such as mineral fillers, pigment fillers, and the like. By "unaged" polymer it is meant free, i.e. unreacted isocyanate groups exist. By "aged" polymer it is meant that generally no unreacted isocyanate groups exist.

Original Embodiment

According to the concepts of the original embodiment, a thermoplastic elastomer polyurethane is utilized. That is, the polyurethanes of the present invention have soft segments or intermediate portions such that the entire polyurethane is generally elastomeric. Any conventional type of polyurethane which is elastomeric can hence be utilized including those known to the art and to the literature. Preferably, the polyurethane is made from a low molecular weight polyester intermediate. Such polymers are well-known and are commercially available. Such types of polymers are also described in *Bruins, Polyurethane Technology,* Interscience Publishers, page 198–200, 1969, as well as in *Modern Plastics Encyclopedia,* Vol. 52, No. 10A, 1975, at page 84.

The preferred thermoplastic elastomer polyurethanes of the original embodiment are preferably free of crosslinking agents and hence are not crosslinked and also generally do not contain any free isocyanate groups therein. A preferred type of polyurethane is made from an intermediate which desirably is a polyester intermediate made by the condensation reaction of a dicarboxylic acid having from 2 to about 10 carbon atoms with a polyol such as a glycol having from 2, that is ethylene glycol, to about 10 carbon atoms. Specific examples of dicarboxylic acids include malonic acid, succinic acid, glutaric acid, adipic acid, pimelic acid, sebacic acid, suberic acid, azelaic acid, maleic acid, and the like. The molecular weight of the polyester intermediate is generally low as from about 500 or 600 to about 1,200 or 1,500. The polyisocyanates utilized are generally aromatic diisocyanates such as triphenylmethane-p,p'-diisocyanate, and the like, as well as the various diphenyl diisocyanates such as diphenyl methane diisocyanate, dichlorodiphenyl methane diisocyanate, diphenyl dimethyl methane diisocyanate, para-phenylene diisocyanate, meta-phenylene diisocyanate, naphthalene-1,5-diisocyanate, meta-tolylene diisocyanate, and the like. The ratios of the various components to one another are important in order to produce a polyester urethane elastomer substantially free of crosslinks and the like. Examples of such polyester intermediates are set forth in U.S. Pat. Nos. 2,770,612 and 2,871,218 to Schollenberger, which are hereby fully incorporated by reference.

Another type of thermoplastic elastomer polyurethane is made from phthalic acids which are reacted with saturated glycols containing from 3 to about 10 carbon atoms to produce a polyester intermediate having a molecular weight of from about 250 to about 2,500. The polyester intermediate is reacted generally with any type of aromatic diisocyanate known to the art with representative examples including para-phenylene diisocyanate, 4,4'-bibenzyl diisocyanate, dianisidene diisocyanate, meta-phenylene diisocyanate, tolylene diisocyanate, bitolylene diisocyanate, and the like. Such a polyurethane is free from crosslinks and generally contains no free isocyanate groups therein. A more detailed description of such types of polyester urethanes is set forth in U.S. Pat. No. 3,015,650 to Schollenberger which is hereby fully incorporated by reference.

Still other types of suitable thermoplastic elastomer polyurethanes which can be utilized are those obtained by reacting a long chain polyester intermediate having a molecular weight of from about 400 to about 10,000, preferably from about 800 to about 6,000 with a polyisocyanate, preferably a diisocyanate, and a chain extender having a molecular weight up to about 400. Preferred chain extenders include short-chain polyols having a molecular weight of up to about 380. The equivalent ratio of isocyanate groups to the hydroxyl groups is from about 0.9 to about 1.1 and preferably from about 0.98 to about 1.04. Hence, these types of polyesters generally have a higher molecular weight than the above-described type. Such elastomer polyester urethanes have a Tg of 0° C. or less and preferably from about minus 10° C. to about minus 55° C. Such polyesters are set forth in U.S. Pat. Nos. 4,397,974 and 4,542,170 which is hereby fully incorporated by reference.

Yet another type of a thermoplastic elastomer polyurethane which can be utilized in the original and which is substantially free from crosslinks is made from a poly(oxyalkylene) polyol with the alkylene group containing from 3 to 6 carbon atoms. This is reacted with an aliphatic glycol containing from 4 to 12 carbon atoms, with from 4 to 6 carbon atoms being preferred. The polyester intermediate generally has a low molecular weight of from about 800 to about 4,000. Such a polyester intermediate is reacted with a diphenyl diisocyanate such as diphenyl methane diisocyanate, diphenyl methane-p,p'-diisocyanate, dichlorodiphenyl methane diisocyanate, dimethyl diphenyl methane diisocyanate, bibenzyl diisocyanate, bitolylene diisocyanate, and the like. Essentially no free unreacted isocyanate remains within the reaction product. A more detailed description of this preferred type of elastomeric polyurethane is set forth in U.S. Pat. No. 2,899,411 to Schollenberger which is hereby fully incorporated by reference.

Generally, it has been found that improved low temperature impact resistance is obtained when the thermoplastic polyurethane elastomer has a Shore D hardness of at least 40 and preferably at least 50.

The impact modifiers of the original embodiment are used in a range of about 1 to about 30 parts, and desirably from about 1 to about 20, and preferably from about 5 to about 15 parts by weight per 100 parts by weight of the polyurethane. The impact modifier is added in an effective amount to improve the impact resistance and especially the low temperature toughness of the polyurethane. By improvement of low temperature toughness, it is meant that the Izod impact strength at −30°C. can be improved according to ASTM D256. Another improvement is that melt processability is improved such that the shear viscosity of the polyurethane is reduced as a result of a lowering of the melt processing temperature and further that this reduction is achieved without causing a non-cohesive external skin to form on a heat formed product.

The impact modifiers of the original embodiment are particularly useful when added to polyurethane blends which include a reinforcing agent and/or a filler. In the past, when a reinforcing agent has been added to polyurethane, the impact resistance, especially at low temperatures or at room temperature, has been poor as has been the melt processability of the resultant composite. Thus, the impact modifiers of the original or one-stage embodiment are useful with reinforced polyurethanes to improve impact resistance, melt processability and to produce polyurethane composites having improved dimensional stability. By improved dimensional stability an improvement in one or more of the following characteristics is meant: flexural modulus, flexural strength, tensile yield strength and heat distortion temperature. When used with reinforced polyurethanes, the amount of the impact modifier can be the same as the amount used for unreinforced polyurethanes.

The impact modifier of the original embodiment is a carbonyl modified polyolefin. More specifically, it is a graft copolymer containing a polyolefin backbone with pendant carbonyl containing compounds. Based upon the entire weight of the graft copolymer, the amount of the polyolefin is from about 90 percent to about 99.9 percent, desirably from about 93 percent to about 98 percent, and preferably from about 95 to about 98 percent by weight. Suitable graft copolymers have a melt index of from about 1 to about 20; desirably from about 1 to about 10; and preferably from about 1 to about 5.

The polyolefin component of the impact modifier (i.e. graft copolymer) is a homopolymer or a copolymer made from one or more monomers having from about 2 to about 6 carbon atoms; and desirably 2 or 3 carbon atoms. Specific examples of suitable polyolefins include the homopolymer of ethylene, propylene, or isobutylene, copolymers of propylene and ethylene, and of ethylene-propylene-diene monomers with the diene having from 4 to 8 carbon atoms. Suitable ethylene polymers for modification include high density polyethylene, low density polyethylene, and linear low density polyethylene. When a copolymer is utilized, the amount of the ethylene monomer utilized and hence the amount of the ethylene repeating unit in the copolymer can vary considerably as from about 1 percent to about 50 percent, desirably from about 3 percent to about 25 percent, with approximately 10 percent by weight being preferred.

The impact modifier includes from about 0.1 to about 10 percent, desirably from about 0.2 to about 7 percent, and preferably from about 0.2 to about 6 percent by weight of a carbonyl compound having the formula where R is a straight or branched $C_1$-$C_8$ aliphatic or preferably an alkyl, and X is OH, or where Y is independently the same as R. Moreover, Y can be jointed to R, that is bonded thereto. Specific examples of suitable carbonyl substituents include carboxylic acids such as formic acid, fumaric acid, or maleic acid, or anhydrides such as maleic anhydride, fumaric anhydride, and the like, with maleic anhydride being preferred.

The impact modifiers are commercially available and can be manufactured in accordance with the processes set forth in *Encyclopedia of Polymer Science and Engineering*, John Wiley & Sons, 1987 (Vol. 9, pp. 275-277) which is hereby incorporated by reference as is fully set forth herein.

Optionally, reinforcing agents can be added to the blends of polyurethane and carbonyl modified polyolefin to improve the dimensional stability. The reinforcing agent is added in an amount of from about 1 to about 50 parts, desirably from about 10 to about 40 and preferably from about 15 to about 30 parts by weight per 100 parts by weight of polyurethane.

The reinforcing agents which are used in the polyurethane blends of the original or one-stage embodiment include those reinforcing agents known in the art but in particular include fibers. Suitable fibers include glass, carbon, and graphite fibers, polyester, nylon, and the like. However, it should be understood that any high melting fibers, i.e., having a melting point greater than about 260° C. can be utilized. It is desirable in this invention to use fibers having a diameter of from about 10 to about 20 microns and a length from about 0.1 to about 1.0 inch; and preferably from about 0.2 to about 0.6 inch. A particularly well suited reinforcing agent is glass fiber having a length from about 0.10 to about 1.0 inch and preferably from about 0.20 to about 0.60 inches such as sold under the Fiberglass trademark and made by the Owens-Corning Fibers and having a conventional sizing agent such as an organoaminosilane.

Fillers which can be used in the invention include those fillers known in the art, such as carbon black, pigments such as titanium dioxide, calcium carbonate, mineral fillers such as silica, and the like. The fillers can be used in amounts of from about 0 to about 40, desirably from about 0 to about 35, and most desirably from about 0 to about 20 parts by weight based on 100 parts by weight of the polyurethane.

In addition to the above, other conventional additives can be added such as antioxidants, antiozonates, and talc which is known as a nucleating agent.

It is an important aspect of the original or one-stage embodiment to utilize a high shear blending device in order to achieve a mechanically compatible physical blend. By the term "mechanical compatibility," it is meant that no notable macroscopic phase separation is observed by the human eye after processing. High shear blending devices include extruders such as a twin screw extruder, a Buss kneader, and the like. The shear rate of such high shear blending devices is generally at least 750/sec. and desirably at least 1,000/sec. The ingredients are charged into the high shear blender as pellets, or powders, preferably through three feeding ports with the polyurethane and impact modifier being added in one port, the fibers in another port, and the filler through a third port. The processing time should be set so that the residence time is at least one minute, and desirably at least 1.5 minutes and less than 4 minutes. The processing temperature is from about 215° to about 235° C., with from about 215° to about 230° C. being preferred. These temperatures are a decrease of at least 5° C. and desirably at least 10° C. from comparable systems not containing the impact modifier of the present invention. The addition of the carbonyl graft copolymer impact modifier of the original or one-stage embodiment results in improved properties such as reduced melt processing viscosity as shown in the following tables.

If a single port feeder is used, all the materials can be charged at the same time, and if a two port feeder is used, the fiber and filler should be added in the same port.

The invention of the original embodiment will be better understood by reference to the following examples.

EXAMPLE 1

A series of non-reinforced polyurethane blends with carbonyl modified polyolefins were prepared using a co-rotating twin-screw extruder (Werner-Pfleider twin screw extruder ZSK-30). About 70 parts by weight of a polyester type thermoplastic elastomer polyurethane essentially made in accordance with U.S. Pat. No. 2,871,218, was fed in the first port. The melt viscosity and various physical properties of the composites are recorded in Tables I through IV.

EXAMPLE 2

A sample of a reinforced polyurethane was prepared using the same extruder as Example 1. The same polyurethane used in Example 1, was used and the melt viscosity and physical properties are recorded in Tables V through VII.

DESCRIPTION OF COMPOUNDS

| | |
|---|---|
| TPU-45D | An aromatic polyester type thermoplastic elastomer polyurethane, Shore Hardness 45D, B F Goodrich, made according to U.S. Pat. No. 2,871,218. |
| TPU-55D | An aromatic polyester type thermoplastic elastomer polyurethane, Shore Hardness 55D, B F Goodrich, made according to U.S. Pat. No. 2,871,218. |
| TPU-70D | An aromatic polyester type thermoplastic elastomer polyurethane, Shore Hardness 70D, made according to U.S. Pat. No. 2,871,218. |
| PRO-FAX PC072: | Maleic Anhydride grafted polypropylene Melt Index 12 (Himont, U.S.A., Inc.). |
| PRO-FAX PF 141: | Maleic Anhydride grafted polypropylene Melt Index 4 (Himont, U.S.A., Inc.). |
| Polybond 1001-20MF: | An acrylic acid modified polypropylene (6% grafted glacial acrylic acid, melt index 20 g/10 min.) BP Performance Polymers Inc., Hacketts Town, New Jersey. |

TABLE I

| | 1A | 1B | 1C | 1D | 1E | 1F | 1G |
|---|---|---|---|---|---|---|---|
| TPU-45D | 100 | 90 | 80 | 90 | 80 | 90 | 80 |
| PROFAX PC 072 | | 10 | 20 | | | | |
| PROFAX PF 141 | | | | 10 | 20 | | |
| Polybond 1001-20MF | | | | | | 10 | 20 |
| Tensile Elongation to Break (%) | 550 | 560 | 560 | 580 | 560 | 560 | 600 |
| Break Strength (psi) | 4200 | 4800 | 6500 | 2900 | 5700 | 2600 | 3100 |
| Flexural Elastic Modulus $\times 10^{-3}$ (psi) | 5.7 | 8.6 | 18 | 6.7 | 16 | 7.3 | 9.7 |
| Izod Impact Strength (ft-lb/in.) Unnotched, $-30°$ C. | 28 | 30 | 6 | 25 | 13 | 25 | 43 |
| Melt Shear Viscosity (pa · s) 210° C. | | | | | | | |
| Shear Rate = 427 sec$^{-1}$ | 918 | 393 | NA | 454 | NA | 492 | NA |
| Shear Rate = 854 sec$^{-1}$ | 546 | 231 | NA | 279 | NA | 284 | NA |
| 220° C. | | | | | | | |
| Shear Rate = 427 sec$^{-1}$ | 459 | 273 | NA | 273 | NA | 295 | NA |
| Shear Rate = 854 sec$^{-1}$ | 339 | 164 | NA | 183 | NA | 194 | NA |

TABLE II

| | 2A | 2B | 2C | 2D | 2E | 2F | 2G |
|---|---|---|---|---|---|---|---|
| TPU-55D | 100 | 90 | 80 | 90 | 80 | 90 | 80 |
| PROFAX PC 072 | | 10 | 20 | | | | |
| PROFAX PF 141 | | | | 10 | 20 | | |
| Polybond 1001-20MF | | | | | | 10 | 20 |
| Tensile elongation to Break (%) | 450 | 440 | 490 | 480 | 440 | 490 | 440 |
| Break Strength psi | 2700 | 2900 | 3400 | 3000 | 2700 | 4900 | 3100 |
| Flexural Elastic $\times 10^{-3}$ Modulus (psi) | 16.8 | 24.8 | 21.9 | 24.7 | 21.1 | 20.4 | 30.3 |
| Izod Impact Strength (ft-lb/in.) Unnotched, $-30°$ C. | 18 | 29 | 49 | 41 | 35 | 40 | 4 |
| Melt Shear Viscosity (pa · s) 210° C. | | | | | | | |
| Shear Rate = 427 sec$^{-1}$ | >5.5 × 10$^4$ | 721 | NA | 742 | NA | 930 | NA |
| Shear Rate = 854 sec$^{-1}$ | | 387 | NA | 426 | NA | 509 | NA |
| 220° C. | | | | | | | |
| Shear Rate = 427 sec$^{-1}$ | 1116 | 361 | NA | 410 | NA | 448 | NA |
| Shear Rate = 854 sec$^{-1}$ | 645 | 205 | NA | 246 | NA | 273 | NA |

TABLE III

| | 3A | 3B | 3C | 3D | 3E | 3F | 3G |
|---|---|---|---|---|---|---|---|
| TPU-70D | 100 | 90 | 80 | 90 | 80 | 90 | 80 |
| PROFAX PC-072 | | 10 | 20 | | | | |
| PROFAX PF 141 | | | | 10 | 20 | | |
| Polybond 1001-20MF | | | | | | 10 | 20 |
| Tensile Elongation to Break (%) | 240 | 180 | 280 | 280 | 350 | 220 | 200 |

TABLE III-continued

| | 3A | 3B | 3C | 3D | 3E | 3F | 3G |
|---|---|---|---|---|---|---|---|
| Break Strength (psi) | 4300 | 4600 | 5400 | 5400 | 4200 | 4500 | 3700 |
| Flexural Elastic Modulus × $10^{-3}$ (psi) | 30 | 38 | 54 | 35 | 44 | 42 | 50 |
| Izod Impact Strength (ft-lb/in.) Unnotched. −30° C. | 4.6 | 25 | 12 | 28 | 16 | 30 | 8 |
| Melt Shear Viscosity (pa · s) 220° C. | | | | | | | |
| Shear Rate = 427 sec$^{-1}$ | 984 | 290 | NA | 328 | NA | 481 | NA |
| Shear Rate = 854 sec$^{-1}$ | 530 | 177 | NA | 218 | NA | 306 | NA |

TABLE IV

| | 4A | 4B | 4C |
|---|---|---|---|
| PROFAX PC-072 | 100 | | |
| PROFAX PF 141 | | 100 | |
| Polybond 1001-20MF | | | 100 |
| Tensile Elongation To Break (%) | 13 | 20 | 28 |
| Break Strength (psi) | 2300 | 4200 | 3400 |
| Thermal Expansion × $10^5$ (1/°C.) | 9.1 | 8.7 | 9.5 |
| Flexural Max Stress (× $10^{-3}$ psi) | 5700 | 6000 | 6600 |
| Elastic Modulus (× $10^{-3}$ psi) | 190 | 195 | 222 |
| Izod Impact Strength (ft-lb/in.) Unnotched, −30° C. | 3 | 3 | 2 |

TABLE V

| | 5A | 5B | 5C | 5D |
|---|---|---|---|---|
| TPU-45D | 75 | 65 | 65 | 65 |
| ¼" Glass Fibers | 25 | 25 | 25 | 25 |
| PROFAX PC072 | | 10 | | |
| PROFAX PF 141 | | | 10 | |
| Polybond 1001-20MF | | | | 10 |
| Flexural Modulus (psi) × $10^{-3}$ | 52 | 101 | 109 | 85 |
| Flexural Stress (psi) × $10^{-3}$ | 2.1 | 3.3 | 3.5 | 2.9 |
| Specific Gravity (g/cm$^3$) | 1.33 | 1.27 | 1.27 | 1.29 |
| Tensile Yield Strength (psi) | 5700 | 5000 | 5300 | 5800 |
| Izod Impact Strength (ft-lb/in.) Unnotched −30° C. | 33 | 20 | 24 | 31 |

TABLE VI

| | 6A | 6B | 6C | 6D |
|---|---|---|---|---|
| TPU-55D | 75 | 65 | 65 | 65 |
| ¼" Glass Fibers | 25 | 25 | 25 | 25 |
| PROFAX PC072 | | 10 | | |
| PROFAX PF 141 | | | 10 | |
| Polybond 1001-20MF | | | | 10 |
| Flexural Modulus (psi) × $10^{-3}$ | 136 | 132 | 140 | 117 |
| Flexural Stress (psi) × $10^{-3}$ | 4.2 | 4.4 | 4.4 | 3.8 |
| Specific Gravity (g/cm$^3$) | 1.34 | 1.26 | 1.27 | 1.29 |
| Tensile Yield Strength (psi) (× $10^{-3}$) | 5.8 | 5.1 | 5.5 | 5.6 |
| Izod Impact Strength (ft-lb/in.) Unnotched (−30° C.) | 27 | 24 | 26 | 31 |

TABLE VII

| | 7A | 7B | 7C | 7D |
|---|---|---|---|---|
| TPU-70D | 75 | 65 | 65 | 65 |
| ¼" Glass Fibers | 25 | 25 | 25 | 25 |
| PC-072 | | 10 | | |
| PF 141 | | | 10 | |
| Polybond 1001-20MF | | | | 10 |
| Flexural Modulus (psi) × $10^{-3}$ | 198 | 259 | 212 | 275 |
| Flexural Stress (psi) × $10^{-3}$ | 6.6 | 8.2 | 6.7 | 8.4 |
| Specific Gravity (g/cm$^3$) | 1.35 | 1.27 | 1.28 | 1.32 |
| Tensile Yield Strength (psi) × $10^{-3}$ | 8.0 | 7.5 | 7.3 | 8.5 |
| Izod Impact Strength (ft-lb/in.) Unnotched −30° C. | 7 | 10 | 9 | 16 |

Tables I, II, and III relate to three different types of polyester-type thermoplastic polyurethanes which were blended with carbonyl modified polyolefins, that is polyolefin graft copolymers. When a soft thermoplastic polyurethane elastomer was utilized, as in Table I, elongation to break properties were generally maintained, break strength was generally improved, the flexural modulus was improved, and the Izod impact strength was generally similar to the control except at high amounts, i.e., about 20 parts by weight. In Table II, when a medium hardness polyurethane elastomer was utilized, similar or improved tensile strength and break strength properties were obtained, as well as improved flex modulus, and unexpectedly improved low temperature impact strength. The use of a fairly hard thermoplastic polyurethane elastomer, as in Table III, generally retained an elongation to break properties, improved break strength, improved flexural modulus, and generally improved the impact strength, especially the low temperature unnotched, impact strength.

Table IV relates to carbonyl modified polyolefin impact modifiers of the present invention which are not blended with any polyurethane. Although flexural modulus was very high, the break strength was low and generally the impact strengths were low. Thus, the blends of the present invention, unexpectedly, improved various physical properties.

Tables V, VI, and VII relate to glass fiber reinforced blends of various thermoplastic polyurethane elastomers and the carbonyl modified polyolefin impact modifiers of the present invention. As apparent from Table V, which relates to a soft thermoplastic polyurethane elastomer, the low temperature impact strength properties were still significant. When a medium hard thermoplastic polyurethane elastomer was utilized, while most physical properties were generally maintained, the low temperature (i.e. −30° C.) impact strengths were dramatically and unexpectedly improved. However, when a hard thermoplastic polyurethane elastomer was utilized as in Table VII, good improvements and low temperature impact strength were achieved.

Thus, the data clearly establishes that the use of carbonyl modified polyolefin plastics as impact modifiers is totally unexpected and yet generally achieves improved impact strength, and improved or maintained dimensional stability.

Thermoplastic Elastomer Polyurethane Composition Embodiment

The thermoplastic elastomer polyurethane composition is generally made in two separate blending or mixing operations. Generally, an unaged polyurethane, that is a polyurethane which contains free isocyanate, is made in situ in a high shear mixer or apparatus. Subsequently, the unaged polyurethane is blended in a high shear mixer or apparatus with modified and/or unmodified polyolefin and optional fibers whereupon the various reactions occur including reaction of the modified polyolefin with the free isocyanate and/or the unaged polyurethane. The composition can optionally contain fillers such as minerals or pigments, impact modifiers, and the like. The composition can be used to produce molded products for automotive applications including, for example, automotive body side moldings, fender extensions, and rocker panels.

The unaged polyurethanes are generally prepared in situ utilizing an excess of a polyisocyanate. More specifically, the thermoplastic elastomer polyurethanes of the present embodiment are prepared by reacting an excess of polyisocyanate with an intermediate such as a hydroxyl terminated polyester, a hydroxyl terminated polyether, or mixtures thereof, and with one or more chain extenders. The hydroxyl terminated polyester intermediate of the intermediate is generally a linear polyester having a molecular weight of from about 500 to about 10,000, desirably from about 700 to about 5,000, and preferably from about 700 to about 4,500, an acid number generally less than 1.3 and preferably less than 0.8. The molecular weight is determined by assay of the terminal functional groups and is an average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol.

The dicarboxylic acids of the desired polyurethane can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, propylene-1,2-glycol, 1,3-propanediol, butylene-1,3-glycol, 1,4-butanediol, 1,6-pentanediol, 1,6-hexanediol, 2,2-dimethylpropane-1,3-diol, 2,2-diethylene-1,3-diol, 1,4-cyclohexanedimethanol, decamethylene glycol, dodecamethylene glycol, and the like. 1,4-butanediol is the preferred glycol. Polyether glycols can also be used and include polytetramethylene ether glycol (PTMEG), polyethylene glycol, polypropylene glycol, ethylene oxide-capped polypropylene glycol, polytetramethylene/ethylene oxide ether glycol, and the like. Such polyether glycols can have a molecular weight of about 500 to 4,000 and preferably from about 800 to about 2,000. A preferred polyether glycol is polytetramethylene ether glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive then secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(propylene-ethylene glycol) comprising propylene oxide and ethylene oxide reacted with propylene glycol, poly(tetramethylene glycol) comprising water reacted with tetrahydrofuran (PTMG), glycerol adduct comprising glycerol reacted with propylene oxide, trimethylopropane adduct comprising trimethylolpropane reacted with propylene oxide, pentaerythritol adduct comprising pentaerythritol reacted with propylene oxide, and similar hydroxyl functional polyethers. Polyether polyols further include polyamide adducts of an alkylene oxide and can include for example ethylenediamine adduct comprising the reaction product of ethylenediamine and propylene oxide, diethylenetriamine adduct comprising the reaction product of diethylenetriamine with propylene oxide, and similar polyamide type polyether polyols. The various polyether intermediates generally have a molecular weight, as determined by assay of the terminal functional groups which is an average molecular weight, of from about 500 to about 10,000, desirably from about 500 to about 5,000, and preferably from about 700 to about 3,000.

The desired polyurethane is made from the above-noted intermediate such as a hydroxyl terminated polyester or polyether which is further reacted with a polyisocyanate, preferably a diisocyanate, along with extender glycol desirably in a so-called one-shot process or simultaneous coreaction of polyester or polyether intermediate, diisocyanate, and extender glycol to produce a moderate molecular weight linear polyurethane, for example having a melt index of from about 1 to about 150 and preferably from about 5 to about 30 at 220° C. at 2,160 grams. The equivalent weight amount of diisocyanate to the total equivalent weight amount of hydroxyl containing components, that is the hydroxyl terminated polyester or polyether and chain extender glycol, is from about 1.01 to about 1.20, desirably from about 1.0 to about 1.08, and preferably from about 1.01 to about 1.03. Suitable diisocyanates include non-hindered aromatic diisocyanates such as: 4,4'-methylenebis-(phenyl isocyanate) (MDI); isophorone diisocyanate (IPDI), m-xylene diisocyanate (XDI), as well as non-hindered cyclic aliphatic diisocyanates such as 1,4-cyclohexyl diisocyanate (CHDI), decane-1,10-diisocyanate, phenylene-1,4-diisocyanate, naphthalene-1,5-diisocyanate, diphenylmethane-3,3'-dimethoxy-4,4'-diisocyanate, dicyclohexylmethane-4,4'-diisocyanate, and cyclohexyl-1,4-diisocyanate. The most preferred non-hindered diisocyanate is 4,4'-methylenebis-(phenyl isocyanate) i.e., MDI.

Suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butane diol, 1,6-hexane diol, 1,3-butane diol, 1,5-pentane diol, 1,4-cyclohexane-dimethanol, hydroquinone di(hydroxyethyl)-ether, and the like, with 1,4-butane diol being preferred.

In the one-shot polymerization process which occurs in situ in the high shear apparatus, a simultaneous reaction occurs between three components, that is the one or more intermediates, the one or more polyisocyanates, and the one or more extender glycols, with the reaction generally being initiated at temperatures above 100° C. and desirably above 120° C. Inasmuch as the reaction is exothermic, the reaction temperature generally increases to about 200° C. or to 280° C.

The modified and/or unmodified polyolefins of the present or generally unaged polyurethane embodiment are used in an amount of up to about 40 parts, desirably from about 1 to about 35 parts by weight, and preferably from about 8 to about 32 parts by weight per 100 parts by weight of the unaged polyurethane.

The polyolefin of the present or the generally two-stage mixing embodiment is either an unmodified, that is a conventional polyolefin polymer, or desirably a modified, for example, a carbonyl containing polyolefin, or blends thereof. With regard to the conventional or unmodified polyolefin, it generally can be any polyolefin or copolymer made from an olefin monomer having from 2 to 6 carbon atoms, such as polyethylene, polypropylene, etc., and preferably is a polypropylene having a melt index from about 1 to about 20 with a specific example being Profax 8523 made by Himont Inc. having a melt index of 4. Another class of an unmodified polyolefin is the various S-B-S block copolymers where the S block is made from a vinyl substituted aromatic having from 8 to about 12 carbon atoms such as styrene, alpha-methylstyrene, and the like, with styrene being preferred, and the B block is made from a conjugated diene having from 4 to 8 carbon atoms such as butadiene, isoprene, hexadiene, and the like, with butadiene being preferred. Such block copolymers are commercially available as Kraton from the Shell Chemical Company. Another class of an unmodified polyolefin is the various $$S-(E/B)-S$$

block copolymers where S is made from a vinyl substituted aromatic having from 8 to about 12 carbon atoms as noted immediately herein above, with styrene being preferred, and the center block is a saturated ethylene-butylene rubber. Such a block copolymer is generally known as a hydrogenated Kraton G as available from the Shell Chemical Company.

The modified polyolefins can be a graft copolymer containing a polyolefin backbone with grafted carbonyl containing compounds. Inasmuch as such modified polyolefins are the same as set forth hereinabove with regard to the original embodiment, the description of the same is hereby fully incorporated by reference for purposes of brevity including the amount of polyolefin therein, the melt index, the types of polyolefins, the specific types of generally grafted carbonyl compounds as well as the formulations thereof, and the like. Another modified polyolefin is the above noted $$S-(E/B)-S$$

block copolymer modified with an anhydrid such as fumaric anhydride, maleic anhydride, and the like, with maleic anhydride being preferred. Such a maleic anhydride modified block copolymer is commercially available as Kraton FGX from the Shell Chemical Company.

Figure 1:
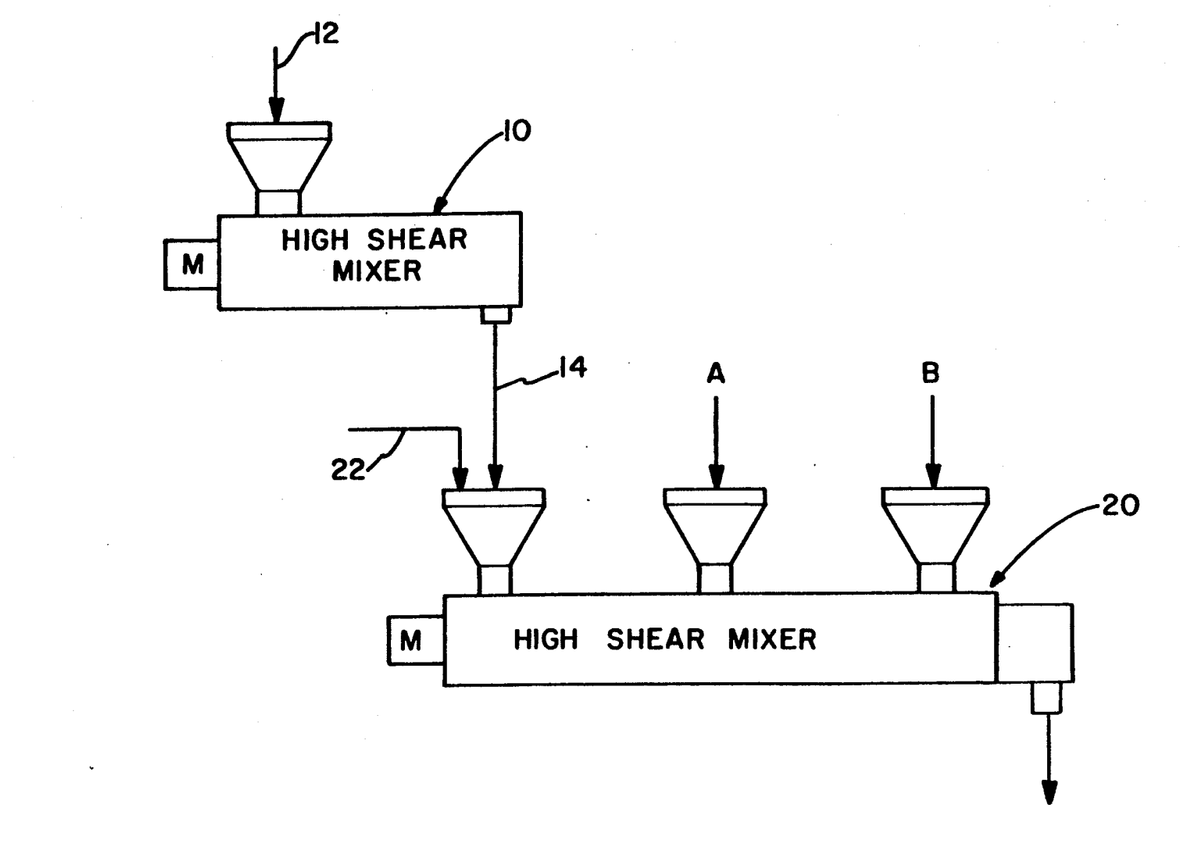
FIG. 1 is a block flow diagram of a two-stage heating processing apparatus.

The present embodiment will be better understood by reference to the drawing. According to the present invention, the various components forming the polyurethane, for example the hydroxyl terminated intermediate, the chain extender and the polyisocyanate are added via feed line 12 to an initial or first high shear mixer wherein the various components are reacted in situ to form the above-noted polyurethane having free isocyanate therein. By the term "free isocyanate," it is meant that unreacted polyisocyanate molecules exist. Examples of suitable high shear mixing devices are those which achieve a mechanically compatible physical blend of the modified and/or unmodified polyolefin and the preformed polyurethane. By the term "mechanical compatibility," it is meant that no notable macroscopic phase separation is observed by the human eye after processing. High shear mixing or blending devices 10 include extruders such as a twin screw extruder, and the like. The shear rate of such high shear blending devices is generally at least 600 reciprocal seconds, desirably at least 750 reciprocal seconds, and preferably at least 1,000 reciprocal seconds. After a suitable processing time which can vary depending upon the type of specific mixer but often is from about 1 or 2 to about 10 minutes at a suitable processing temperature of from about 200° to about 230° C. and preferably from about 200° to about 220° C., the unaged preformed polyurethane, that is a polyurethane containing free isocyanate, is then transferred to a second high shear mixer 20 desirably having a plurality of feed ports as by feed line to 14. The polyolefin, be it an unmodified polyolefin and/or modified polyolefin as described hereinabove, is generally added to the second high shear mixer at the same port as through feed line 22. The second high shear mixing device generally has a shear rate of at least 600, desirably 750, and preferably at least 1,000 reciprocal seconds. Although the modified and/or unmodified polyolefin is shown as being added at the same feed port as the unaged polyurethane, it can also be added at any subsequent port. Alternatively, the polyolefin can be added to any port with the unaged polyurethane being added to a subsequent feed port. The important criteria is that the unaged polyurethane component and the polyolefin component have sufficient blend time with each other to generally react with each other. That is, the modified polyolefins or the unmodified polyolefins containing points of unsaturation will generally react with the polyisocyanate, or the polyurethane polymer, or both. Although generally any saturated unmodified polyolefin such as polypropylene will not react with the polyisocyanate or the polyurethane, due to the high shear conditions and/or the processing temperature, a minor amount thereof may nevertheless be reacted. As should be apparent, a multiplicity of reactions can occur and yield the thermoplastic elastomer polyurethane composition of the present invention.

Although the drawing discloses a three-port mixing device, it is to be understood that any mixing device having a plurality of ports can be utilized.

Although optional, preferably reinforcing fibers are also added, the description of which is set forth in the original embodiment and thus is hereby fully incorporated by reference. By way of summary, such fibers can be glass, carbon, nylon, graphite, polyester, and the like. Although the fibers can be added at any port, desirably they are typically added to the last port so that they do not undergo extensive breaking due to the high shear mixing. The amount of the fibers is generally up to 50 parts by weight, and desirably from about 10 about 30 parts by weight for every 100 parts by weight of the unaged polyurethane utilized.

Various conventional additives can be added to the high shear mixing device and the same is known to the art as well as to the literature and include various fillers such as pigments, clays, silica, and the like, various antioxidants, various antiozonates, various nucleating agents, and the like. The location of the various additives is not important so long as adequate mixing time exists so that such additives are thoroughly dispersed within the composition. Thus, in the embodiment shown in the drawing, the various additives can be added at either the first port, the second port, or the third port, and desirably are added to the second port.

Although processing times can vary greatly depending upon various factors including the type of mixer, the efficiency of achieving a mechanical compatible blend, and the like is generally relatively short as from about 1 or about 1.5 minutes to about 10 minutes. Processing temperatures in the second high shear mixer are generally similar to the first mixer and can range from about 215° to about 235° C. and desirably from about 215° to about 230° C.

The net result of the at least two-stage high shear mixing procedure is to form in situ within the first stage an unaged polyurethane which, in the second mixing stage, is generally reacted with an unmodified and/or modified polyolefin to form a thermoplastic elastomer polyurethane composition. Of course, if desired, additional high shear mixers can be utilized with the various components, additives, and fibers being added at the second or subsequent mixing stage so long as sufficient time exists for the various components to be blended and for the polyolefin to generally react with the unaged polyurethane.

Examples 3 and 4 and Tables VIII and IX are directed to the preparation of unaged polyurethane containing free isocyanate with a polyolefin, either unmodified or modified. The unaged preformed polyurethane containing free isocyanate was prepared in the first heating processing apparatus and then transferred to a second heating processing apparatus for blending with the polyolefin, fibers, and fillers.

EXAMPLE 3

A series of non-reinforced blends of unaged polyurethane with and without carbonyl modified polyolefins were prepared using a co-rotating twin screw extruder (Werner Pflieder twin screw extruder ZSK-30). The unaged polyester type thermoplastic elastomer polyurethane contained 0.07 percent by weight of free isocyanate and was made in a manner as set forth in Example 1. The unaged polyurethane was fed to the first port of a three-port Werner Pflieder twin screw extruder Model ZSK-30. The flexural modulus, flexural stress, and melt shear viscosity properties of the reacted product are set forth in Table VIII.

EXAMPLE 4

A reinforced polyurethane was prepared in the same manner as set forth in Example 3, except that glass fibers were added to the third port of the second high shear twin screw extruder mixing apparatus. Flexural modulus, flexural stress, and melt shear viscosity properties are set forth in Table IX.

| DESCRIPTION OF COMPOUNDS | |
|---|---|
| PRO-FAX PC072: | Maleic Anhydride grafted polypropylene Melt Index 12 (Himont, U.S.A., Inc.). |
| PRO-FAX PF 141: | Maleic Anhydride grafted polypropylene Melt Index 4 (Himont, U.S.A., Inc.). |
| Polybond 001-20MF: | An acrylic acid modified polypropylene (6% grafted glacial acrylic acid, melt index 20 g/10 min.) BP Performance Polymers Inc., Hacketts Town, New Jersey. |
| Polyurethane | An aromatic polyester type thermoplastic elastomer polyurethane, Shore hardness 55D, having 0.07 percent by weight of free isocyanate, B F Goodrich. |
| Profax 8523 | An unmodified polypropylene, melt index 4 (Himont, USA., Inc.). |

TABLE VIII

| | 8A | 8B | 8C | 8D | 8E | 8F | 8G | 8H | 8I | 8J | 8K | 8L | 8M |
|---|---|---|---|---|---|---|---|---|---|---|---|---|---|
| Unaged Polyurethane of Example 3 | 100 | 90 | 80 | 70 | 90 | 80 | 70 | 90 | 80 | 70 | 90 | 80 | 70 |
| Profax PC072 | | 10 | 20 | 30 | | | | | | | | | |
| Profax 141 | | | | | 10 | 20 | 30 | | | | | | |
| Polybond 1001-20MF | | | | | | | | 10 | 20 | 30 | | | |
| Profax 8523 | | | | | | | | | | | 10 | 20 | 30 |
| Flexural Elastic Modulus ($\times 10^{-3}$ psi) | 10.6 | 25.8 | 50.9 | 76.4 | 30.0 | 50.9 | 74.3 | 23.9 | 36.4 | 29 | 18.8 | 29.2 | 40.0 |
| Flexural Stress ($\times 10^{-3}$ psi) | 0.49 | 1.0 | 1.79 | 2.5 | 1.1 | 1.8 | 2.6 | 0.97 | 1.4 | 1.24 | 0.82 | 1.14 | 1.42 |
| Melt Shear Viscosity (pa · s) @ 210° C. Shear Rate | | | | | | | | | | | | | |
| = 300 sec$^{-1}$ | >55000 | 3260 | 1190 | 500 | 1420 | 1660 | 900 | 1640 | 1240 | 1430 | 1630 | 1040 | 880 |
| = 750 sec$^{-1}$ | >55000 | 860 | 624 | 339 | 860 | 860 | 430 | 790 | 520 | 540 | 830 | 520 | 430 |

TABLE VIII-continued

|  | 8A | 8B | 8C | 8D | 8E | 8F | 8G | 8H | 8I | 8J | 8K | 8L | 8M |
|---|---|---|---|---|---|---|---|---|---|---|---|---|---|
| = 1500 sec$^{-1}$ | >55000 | 540 | 374 | 176 | NA | NA | 240 | 437 | 300 | 320 | 450 | 280 | 240 |

TABLE IX

|  | 9A | 9B |
|---|---|---|
| Unaged Polyurethane | 75 | 65 |
| ¼" Glass Fibers | 25 | 25 |
| Profax 8523 |  | 10 |
| Flexural Modulus ($\times 10^{-3}$ psi) | 141 | 193 |
| Flexural Stress $\times 10^{-3}$ psi) | 4.6 | 5.7 |
| Melt shear viscosity (pa · s) @ 210° C. Shear rate |  |  |
| = 300 sec$^{-1}$ | 1330 | 1210 |
| = 750 sec$^{-1}$ | 880 | 640 |
| = 1550 sec$^{-1}$ | 620 | 360 |

As apparent from Table VIII, the reacted product of the unaged polyurethane and the polyolefin, including even the unmodified polyolefin, had better flex modulus, flex stress values, as well as generally lower melt viscosities. Similarly, Table IX reveals that the utilization of reinforced glass fibers also resulted in improved physical properties.

Also, as shown in Tables VI and IX, the flexural modulus and flexural stress of fiber-reinforced composite of unaged polyurethane (Example 9A, Table IX) is higher than that of the aged polyurethane composite (Example 6A, Table VI), despite the fact that the flexural modulus and flexural stress of unaged polyurethane is lower than that of aged polyurethane. Furthermore, the fiber-reinforced composite containing unaged polyurethane and polyolefin resulted in significantly improved flexural modulus and flexural stress as shown in Tables IX and VI.

Thus, the data clearly establishes that the use of unaged polymer containing free isocyanates in a two-stage high shear processing apparatus produces a polyurethane blend having improved flexural modulus and strength, and improved or maintained dimensional stability.

While in accordance with the Patent Statutes, the best mode and preferred embodiment have been set forth, the scope of the invention is not limited thereto, but rather by the scope of the attached claims.

I claim:

1. A thermoplastic elastomer polyurethane composition, comprising:
   the reaction product consisting essentially of approximately 100 parts by weight of an unaged polyurethane containing free isocyanate with a modified polyolefin, in the presence of high shear of at least 600 reciprocal seconds, the amount of said modified polyolefin, being up to about 40 parts by weight, said unaged polyurethane made from a hydroxyl-terminated intermediate, a chain extender glycol, and an excess of polyisocyanate, the equivalent weight amount of said polyisocyanate to said hydroxyl-terminated intermediate and said chain extender being from about 1.01 to about 1.20.

2. A thermoplastic elastomer polyurethane composition according to claim 1, wherein said unaged polyurethane has a melt index of from about 1 to about 150 at 200° C. and 2,160 grams.

3. A thermoplastic elastomer polyurethane composition according to claim 2, wherein the amount of said modified polyolefin is from about 1 part to about 35 parts by weight.

4. A thermoplastic elastomer polyurethane composition according to claim 3, wherein said high shear has a shear rate of at least 750 reciprocal seconds, wherein said modified polyolefin polymer is a graft copolymer containing a polyolefin backbone and pendant carbonyl groups, or an anhydride modified $$S\text{-}(E/B)\text{-}S$$

block copolymer.

5. A thermoplastic elastomer polyurethane composition according to claim 4, wherein said melt index is from about 5 to about 30, and wherein said carbonyl group of said modified polyolefin is derived from an anhydride of carboxylic acid having from 1 to 8 carbon atoms.

6. A thermoplastic elastomer polyurethane composition according to claim 5, wherein said high shear is a shear rate of at least 1,000 reciprocal seconds, wherein the amount of said modified polyolefin, is from about 8 to about 32 parts by weight, wherein said modified polyolefin is a polypropylene backbone and said carbonyl group is derived from an anhydride having from 4 to 8 carbon atoms, and wherein said isocyanate/hydroxyl equivalent weight ratio is from about 1.01 to about 1.08.

7. A thermoplastic elastomer polyurethane composition according to claim 5, wherein said modified polyolefin is a copolymer of propylene and ethylene graft-modified with from about 0.2 to about 7 percent by weight of maleic anhydride.

8. A thermoplastic elastomer polyurethane composition according to claim 7, wherein said unaged polyurethane is made from a polyester intermediate, wherein said polyester intermediate is made from adipic acid and 1,4-butane diol, wherein said polyester intermediate has a molecular weight of from about 700 to about 4,500, and wherein said polyisocyanate is MDI.

9. A thermoplastic elastomer polyurethane composition according to claim 1, including up to 50 parts by weight of fiber.

10. A thermoplastic elastomer polyurethane composition according to claim 4, including up to 50 parts by weight of fiber.

11. A thermoplastic elastomer polyurethane composition according to claim 3, including of from about 10 to about 30 parts by weight of fiber.

12. A thermoplastic elastomer polyurethane composition according to claim 6, including of from about 10 to about 30 parts by weight of fiber.

13. A thermoplastic elastomer polyurethane composition according to claim 8, including of from about 10 to about 30 parts by weight of fiber.

14. A thermoplastic elastomer polyurethane composition according to claim 12, wherein said fibers are glass fibers.

15. A thermoplastic elastomer polyurethane composition according to claim 13, wherein said fibers are glass fibers.

* * * * *